(12) United States Patent
Jin (10) Patent No.: US 12,181,003 B2
(45) Date of Patent: Dec. 31, 2024

(54) CONTROL MECHANISM FOR CLUTCH

(71) Applicant: ZHEJIANG XINKE TRANSMISSION TECHNOLOGY CO., LTD, Jiaxing (CN)

(72) Inventor: Jianhua Jin, Linhai (CN)

(73) Assignee: ZHEJIANG XINKE TRANSMISSION TECHNOLOGY CO., LTD, Jiaxing (CN)

( * ) Notice: Subject to any disclaimer, the term of this patent is extended or adjusted under 35 U.S.C. 154(b) by 0 days.

(21) Appl. No.: 18/130,480

(22) Filed: Apr. 4, 2023

(65) Prior Publication Data

US 2023/0265897 A1 Aug. 24, 2023

Related U.S. Application Data

(63) Continuation of application No. PCT/CN2022/084766, filed on Apr. 1, 2022.

(30) Foreign Application Priority Data

Feb. 23, 2022 (CN) .......................... 202210166167.X (51) Int. Cl.
*F16D 28/00* (2006.01)
*F16D 23/12* (2006.01)
*F16D 23/14* (2006.01)

(52) U.S. Cl.
CPC .............. *F16D 23/14* (2013.01); *F16D 28/00* (2013.01); *F16D 2023/123* (2013.01); *F16D 2023/141* (2013.01)

(58) Field of Classification Search
CPC ............... F16D 21/00; F16D 67/00–02; F16D 23/12–2023/141; F16H 63/18
See application file for complete search history.

(56) References Cited

U.S. PATENT DOCUMENTS

| 2012/0018274 | A1* | 1/2012 | Prix | F16H 61/0403 |
| | | | | 192/84.1 |
| 2012/0096986 | A1* | 4/2012 | Suzuki | F16D 28/00 |
| | | | | 74/665 F |
| 2019/0152316 | A1* | 5/2019 | Wentz | B60K 17/344 |

FOREIGN PATENT DOCUMENTS

| CN | 102052412 A | 5/2011 |
| CN | 106481684 A | 3/2017 |

(Continued)

OTHER PUBLICATIONS

International Search Report issued in corresponding International application No. PCT/CN2022/084766, mailed Nov. 22, 2022.

(Continued)

*Primary Examiner* — Ernesto A Suarez
*Assistant Examiner* — Lillian T Nguyen
(74) *Attorney, Agent, or Firm* — Daniel M. Cohn; Howard M. Cohn (57) ABSTRACT

Disclosed is a control mechanism for a clutch, including a power unit, a drive unit, a shift fork and a clutch press unit. The power unit includes an actuator motor and a power shaft; the drive unit includes a shift cam and a clutch cam which are both fixed to the power shaft; the shift fork is connected to the shift cam; and the clutch press unit includes a press part with two ends provided with a power portion and a pivot portion respectively. A press portion is disposed in a middle of the press part. The power portion is connected to the clutch cam, an elastic alignment structure is disposed between the pivot portion and a housing, and a return portion, corresponding to a position between the pivot portion and the press portion, is disposed at the press part and is provided with a return structure.

13 Claims, 8 Drawing Sheets

(56) References Cited

FOREIGN PATENT DOCUMENTS

| | | |
|---|---|---|
| CN | 206175575 U | 5/2017 |
| CN | 107842564 A | 3/2018 |
| CN | 108825675 A | 11/2018 |
| CN | 110173516 A | 8/2019 |
| EP | 0023170 A1 | 1/1981 |
| EP | 1703160 A1 | 9/2006 |
| JP | 2000136831 A | 5/2000 |
| JP | 2003083360 A | 3/2003 |
| WO | WO-2019189006 A1 * | 10/2019 |

OTHER PUBLICATIONS

Written Opinion of the International Search Authority in corresponding International application No. PCT/CN2022/084766, mailed Nov. 22, 2022.

* cited by examiner

CONTROL MECHANISM FOR CLUTCH

TECHNICAL FIELD

The present disclosure belongs to the technical field of clutches, and more particularly relates to a control mechanism for a clutch.

BACKGROUND

A clutch is located in a flywheel housing between an engine and a gearbox, a clutch assembly is fixed to a rear plane of a flywheel through screws, and an output shaft of the clutch is an input shaft of the gearbox. In an automobile running process, a driver can put the foot on or off a clutch pedal as needed to make the engine and the gearbox temporally disconnected or gradually connected, so as to cut off or transmit power input by the engine to the gearbox.

A wet multi-plate clutch is commonly engaged through an oil pressure, that is, the oil pressure is adopted as a power source to push the multi-plate clutch to be engaged.

The oil pressure has the advantages that firstly, due to the high action pressure, the clutch press force is large, as well as the torque transmission capacity is high; secondly, it is easy to control the oil pressure, so that speed change control is also easy; and thirdly, the oil pressure is completed through operation of an independent system, which cannot influence the outside.

An oil hydraulic system is widely applied to previous gearboxes, but due to its complex structure, oil hydraulic action also requires an oil hydraulic pump, which reduces the overall efficiency of the gearboxes. In order to apply the multi-plate clutch in an electric vehicle (EV) and avoid efficiency reduction caused by the oil hydraulic pump, a control mechanism not using a pump is expected.

SUMMARY

Specific to defects in the prior art, the present disclosure adopts a motor as power for driving a clutch to be engaged, a shift fork and a clutch press unit simultaneously act through one-time transmission to realize rapid gear shifting, and when the clutch abrades, sufficient press force can be guaranteed through an elastic alignment structure.

To realize the above purposes, the present disclosure provides a following technical solution: a control mechanism for a clutch includes a power unit, a drive unit, a shift fork, a clutch press unit and a housing, where the power unit includes an actuator motor and a power shaft which are connected;

the drive unit includes a shift cam and a clutch cam which are both fixed to the power shaft;

the shift fork is connected to the shift cam; and the clutch press unit includes a press part with two ends provided with a power portion and a pivot portion respectively, a press portion is disposed in a middle of the press part, the power portion is connected to the clutch cam, an elastic alignment structure is disposed between the pivot portion and the housing, and a return portion, corresponding to a position between the pivot portion and the press portion, is disposed at the press part and is provided with a return structure.

Further, the elastic alignment structure includes a pin. The housing is provided with a sliding groove, one end of the pin stretches into the sliding groove, and the other end is located outside the sliding groove. A limit structure limiting the pin from sliding out by the distance is disposed between the pin and the housing, the end, located outside the sliding groove, of the pin is rotationally connected to the pivot portion, and compensation springs are disposed between the pin and the housing.

Further, the limit structure includes a brake plate and a spring press plate. The brake plate is fixedly connected to the housing, and an interval is reserved between the brake plate and the housing. The spring press plate is located below the brake plate, the compensation springs are located between the spring press plate and the housing, and the pin is connected to the spring press plate.

Further, the housing is provided with accommodating grooves, and the compensation springs are disposed in the accommodating grooves.

Further, the plurality of compensation springs are arranged, and are evenly distributed around the pin.

Further, a joint of the pin and the pivot portion is set as a ball head structure.

Further, the return structure includes a fixed press plate and a return spring, the fixed press plate is fixed to the housing, an interval is reserved between the fixed press plate and the housing, the return portion is located between the fixed press plate and the housing, and the return spring is located between the fixed press plate and the return portion.

Further, the press portion is in a closed ring shape, a press ring is disposed on an inner side of the press portion, one side of the press ring protrudes out of the press portion, the press ring is rotationally connected to the press portion through a rotating shaft, and an axis of the rotating shaft is perpendicular to a connecting line of the power portion and the pivot portion.

Further, the housing is provided with a guide cylinder, and the press ring sleeves the guide cylinder and is in sliding connection to the guide cylinder.

Compared with the prior art, the present disclosure has the beneficial effects: the motor is adopted as the power to be used in cooperation with a supercharged press unit to apply high pressure to a multi-plate clutch on an electric vehicle; through the one-time action, the shift fork and the clutch press unit simultaneously act to realize rapid gear shifting; and when the multi-plate clutch abrades, sufficient press force can be guaranteed through the elastic alignment structure.

Reference numerals: 1—housing; 11—guide cylinder; 12—accommodating groove; 2—power unit; 21—actuator motor; 22—power shaft; 3—drive unit; 31—shift cam; 32—clutch cam; 4—shift fork; 5—press part; 51—power portion; 511—transfer rotor; 52—press portion; 53—pivot portion; 54—return portion; 6—combined bearing; 7—press ring; 8—elastic alignment structure; 81—pin; 82—brake plate; 83—spring press plate; 84—compensation spring; 9—return structure; 91—fixed press plate; 92—return spring; 10—multi—plate clutch; 101—inner hub; 102—outer hub; 100—first-gear structure; and 200—second-gear structure.

DETAILED DESCRIPTION

Embodiments of a control mechanism for a clutch in the present disclosure are further described with reference to FIG. 1 to FIG. 8.

In the description of the present disclosure, it needs to be noted that orientation and position relationships indicated by location words, such as terms "center", "transverse (X)", "longitudinal (Y)", "vertical (Z)", "length", "width", "thickness", "upper", "lower", "front", "rear", "left", "right", "upright", "horizontal", "top", "bottom", "inner", "outer", "clockwise", "anticlockwise", etc., are orientation or position relationships shown based on the drawings, are adopted not to indicate or imply that indicated devices or members must be in specific orientation or structured and operated in specific orientation but only to conveniently describe the present disclosure and simplify the description, and thus should not be understood as limitations to the specific scope of protection of the present disclosure.

In addition, terms such as "first" and "second" are merely used for describing the purpose but not understood as indicating or implying relative importance or implicitly indicating the number of technical features. Thus, features limited with "first" and "second" may indicate or implicitly include one or more of the features. In the description of the present disclosure, "a plurality of" and "some" mean two or more, unless otherwise clearly and specifically limited.

The control mechanism for a clutch includes a power unit 2, a drive unit 3, a shift fork 4, a clutch press unit and a housing 1, where the power unit 2 includes an actuator motor 21 and a power shaft 22 which are connected;

the drive unit 3 includes a shift cam 31 and a clutch cam 32 which are both fixed to the power shaft 22;

the shift fork 4 is connected to the shift cam 31; and the clutch press unit includes a press part 5 with two ends provided with a power portion 51 and a pivot portion 53 respectively. A press portion 52 is disposed in a middle of the press part 5. The power portion 51 is connected to the clutch cam 32, an elastic alignment structure 8 is disposed between the pivot portion 53 and the housing 1, and a return portion 54, corresponding to a position between the pivot portion 53 and the press portion 52, is disposed at the press part 5 and is provided with a return structure 9.

The housing 1 in the present disclosure may serve as a housing 1 of a gearbox, which can fix various units inside; and a reduction gear set is disposed between the actuator motor 21 and the power shaft 22 to increase torque.

Figure 8:
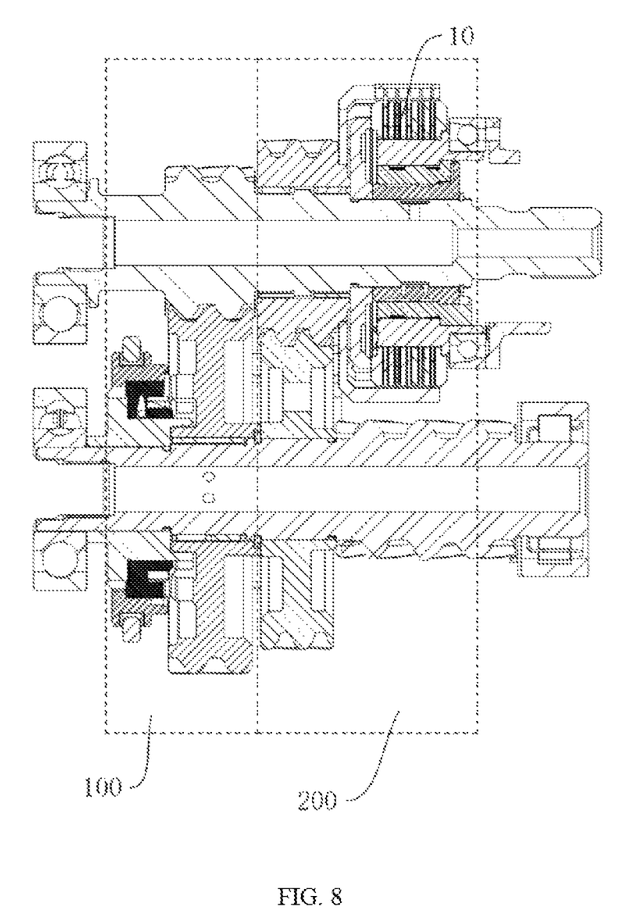
FIG. 8 is a structural schematic diagram of two gears in an electric vehicle.

As shown in FIG. 8, the control mechanism for a clutch in the present disclosure is applied to an electric vehicle. The electric vehicle has two gears, where the shift fork 4 is connected to a first gear, and the clutch press unit is connected to a second gear. A first-gear structure 100 in the gearbox in the present disclosure may adopt a low gear structure (an engage-disengage structure) disclosed, in the previous application No. 201710902598.7, by the applicant, and a second-gear structure 200 may adopt a clutch structure disclosed, in the previous application No. 201810915737.4, by the applicant.

Figure 4:
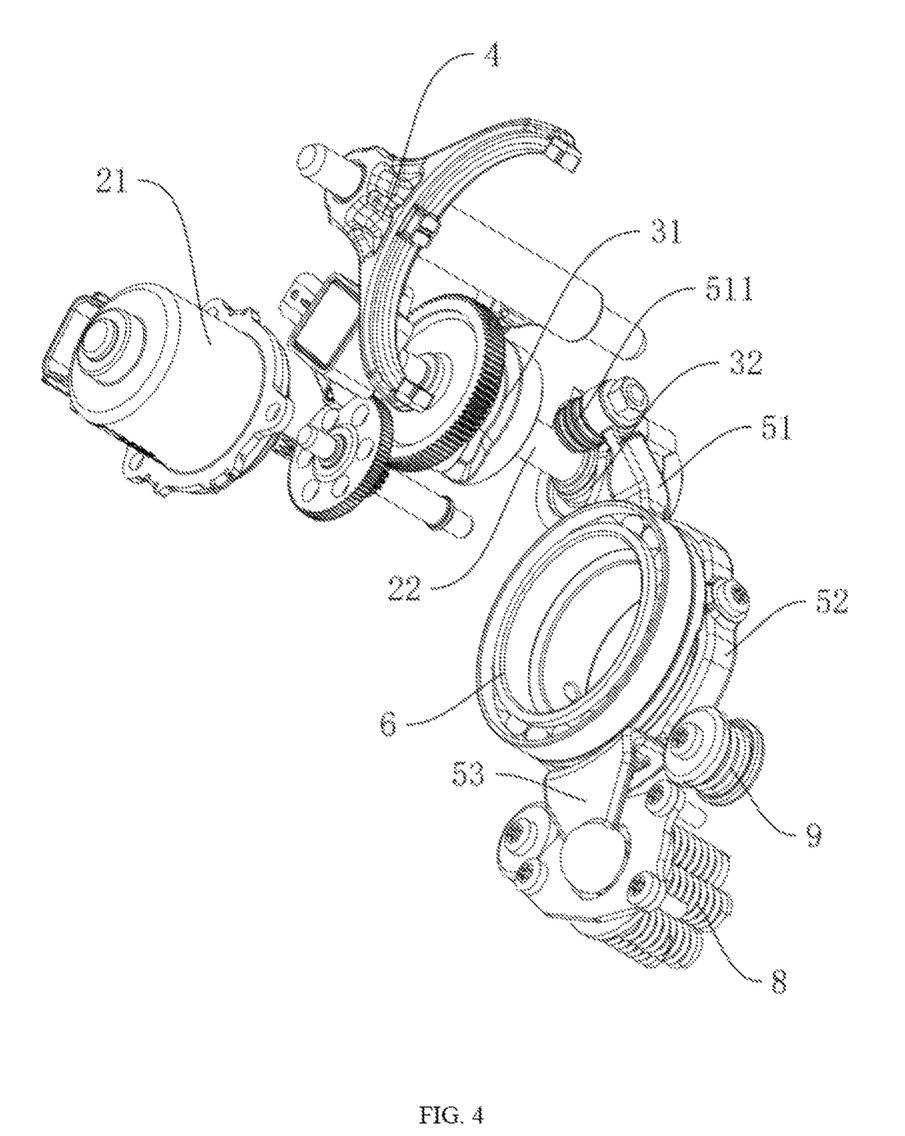
FIG. 4 is a solid structural diagram (without a housing) according to the present disclosure.

The drive unit 3 in the present disclosure may make the shift fork 4 and the clutch press unit move back and forth in an axial direction of the power shaft 22 in a rotation process of the power shaft 22. As shown in FIG. 4, a gear groove is formed in a circumferential surface of the shift cam 31 and axially changes in position, and the shift fork 4 can move in the axial direction through cooperation of a running pulley and the gear groove. The clutch cam 32 may be the same with the shift cam 31 in structure, or adopts a following manner that the clutch cam 32 adopts a valley structure with one surface provided with a toggle, and the power portion 51 of the press part 5 is provided with a transfer rotor 511 matched with the valley structure.

According to the viewing angle shown in FIG. 8, when the shift fork 4 and the clutch press unit apply force leftwards, the second gear is engaged, the first gear is disengaged, and during rightward movement, the second gear is disengaged, and the first gear is engaged. The press part 5 in the present disclosure and a second-gear multi-plate clutch 10 are in connection transition through a combined bearing 6, that is, the press portion 52 of the press part 5 abuts against the combined bearing 6, and when the press part 5 moves leftwards, the press part 52 leftwards extrudes the combined bearing 6 so as to make the multi-plate clutch 10 engaged.

Figure 7:
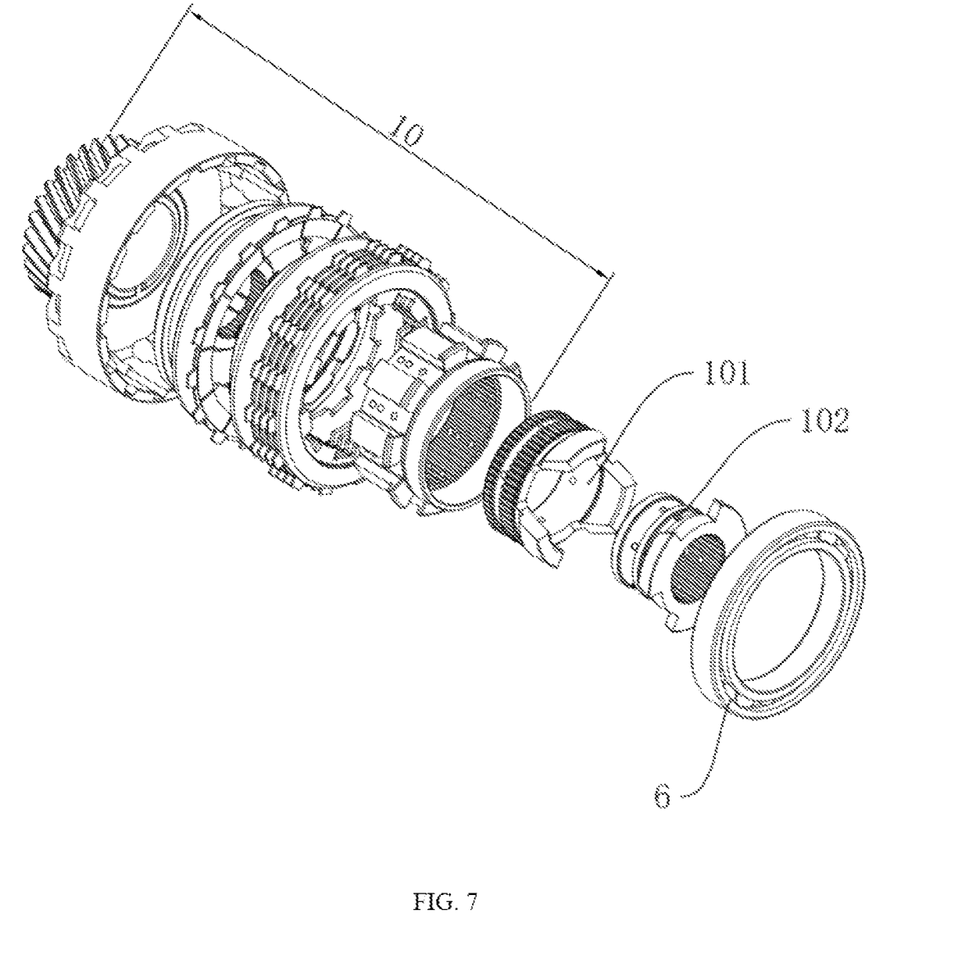
FIG. 7 is an exploded view of a multi-plate clutch and a supercharged press unit.

The second-gear structure 200 in the embodiment has a supercharged press unit, namely a press unit in the patent No. 201810915737.4. The press unit includes an inner hub 101 connected to a shaft sleeve. A butt-joint structure is disposed between the inner hub 101 and an outer hub 102, and includes a plurality of bosses disposed on an outer surface of the inner hub 101 and grooves formed in an inner surface of the outer hub 102 and matched with the bosses, where the bosses, in an axial direction of the shaft sleeve, expand from one side close to a second friction plate assembly to the other side. Slopes are formed in two ends, in a circumferential direction of the inner hub 101, of each boss, and correspondingly, slopes are formed in two ends, in a circumferential direction of the outer hub 102, of each groove. When the shaft sleeve rotates to drive the inner hub 101 to rotate, the slope in one end of each boss is attached to the corresponding slope of the corresponding groove, and through a slope matched structure, the inner hub 101 generates, through cooperation of the bosses and the grooves, tangential component force in a rotation speed direction of the inner hub 101 and axial component force pointing at a friction plate unit in the axial direction of the shaft sleeve to the outer hub 102 at the slope junction. The tangential component force drives the outer hub 102 to rotate, and under the combined action of the axial component force and press force of the combined bearing 6, a first friction plate assembly is pressed, or the first friction plate assembly and the second friction plate assembly are pressed. When the shaft sleeve reversely rotates, drive component force and axial component force are generated through mutual cooperation of the slopes in the other ends of the bosses and the grooves.

Through the arrangement, the combined bearing 6 is only required to apply low press force to make the first friction plate assembly or a combination of the first friction plate assembly and the second friction plate assembly reach a half-engagement state, and under the action of the butt-joint structure, the inner hub 101 generates the axial component force pointing at the friction plate unit in the axial direction of the shaft sleeve to the outer hub 102, so that the first friction plate assembly or the combination of the first friction plate assembly and the second friction plate assembly is completely engaged. Accordingly, a driving apparatus with low driving power, such as a drive motor can be used to drive the combined bearing 6 to realize engagement of the clutch, thereby reducing stress of the combined bearing 6 and prolonging the service life.

Figure 5:
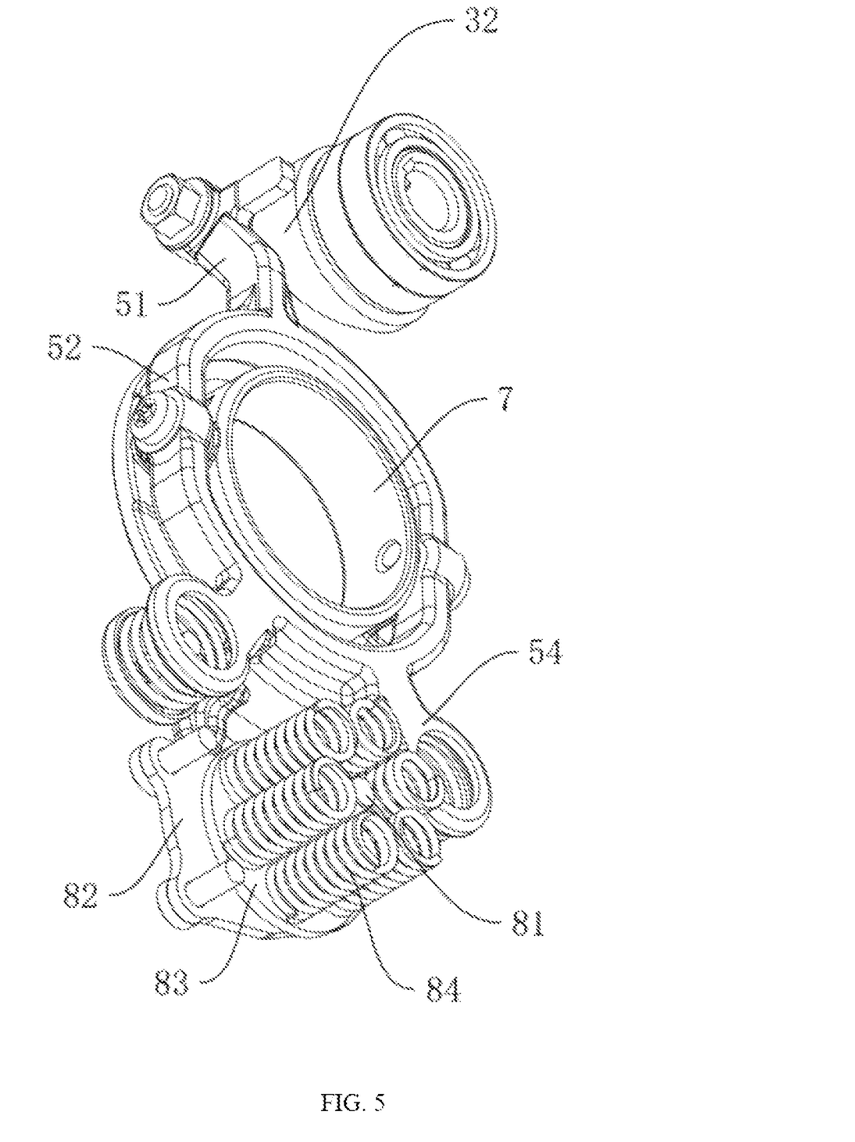
FIG. 5 is a first solid structural diagram of a clutch press unit according to the present disclosure.

As shown in FIG. 4 and FIG. 5, the preferred elastic alignment structure 8 in the embodiment includes a pin 81. The housing 1 is provided with a sliding groove, one end of the pin 81 stretches into the sliding groove, and the other end is located outside the sliding groove. A limit structure limiting the pin from sliding out by the distance is disposed between the pin 81 and the housing 1, the end, located outside the sliding groove, of the pin 81 is rotationally connected to the pivot portion 53, and compensation springs 84 are disposed between the pin 81 and the housing 1.

Specifically, the limit structure includes a brake plate 82 and a spring press plate 83. The brake plate 82 is fixedly connected to the housing 1, and an interval is reserved between the brake plate 82 and the housing 1. The spring press plate 83 is located below the brake plate 82, the compensation springs 84 are located between the spring press plate 83 and the housing 1, and the pin 81 is connected to the spring press plate 83.

In the embodiment, preferably, the brake plate 82 and the spring press plate 83 are provided with holes for the pin 81 to penetrate through, and the brake plate 82 can prevent the spring press plate 83 from penetrating through. The pin 81 and the spring press plate 83 can be fixedly connected, or a position, corresponding to an outer side of the spring press plate 83, of the pin 81 is provided with a baffle ring, and after the spring press plate 83 makes contact with the baffle ring, the pin 81 is pushed to integrally rise (moving out of the sliding groove).

Figure 1:
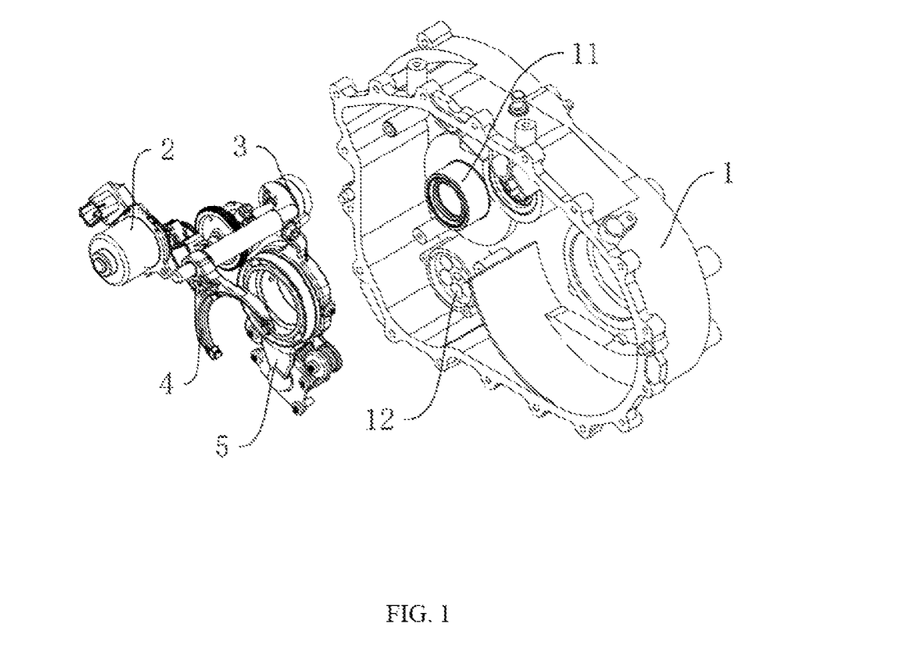
FIG. 1 is a schematic diagram that a housing is separated from other structures according to the present disclosure.
Figure 2:
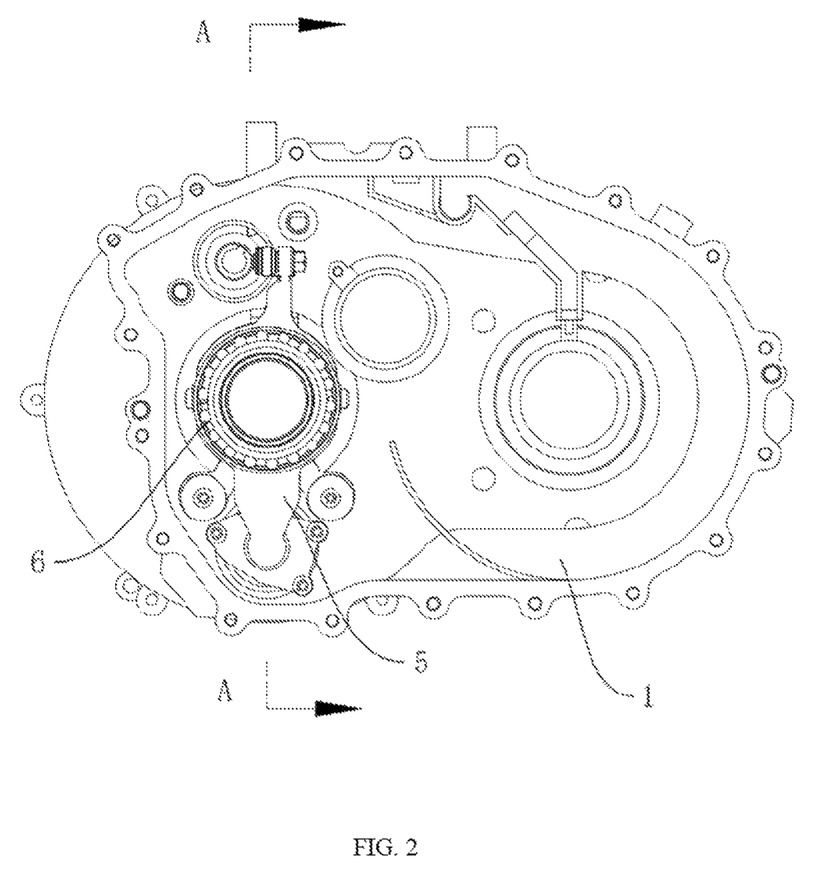
FIG. 2 is a front view according to the present disclosure.
Figure 3:
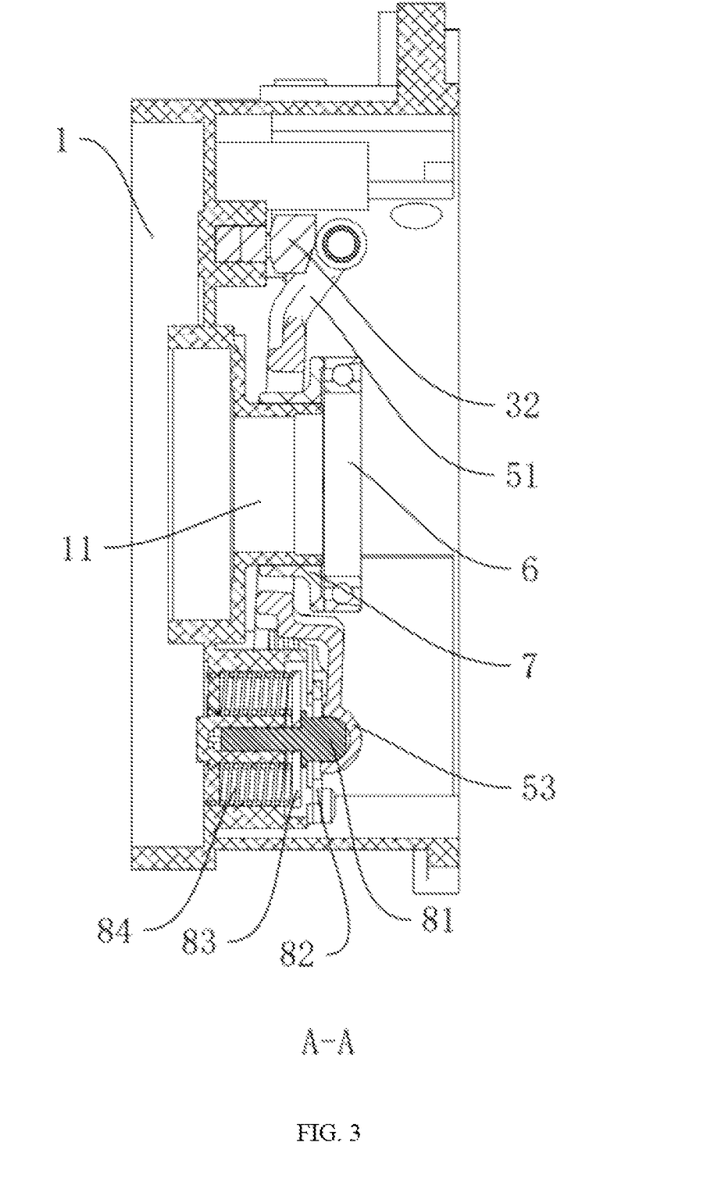
FIG. 3 is a section view of A-A in FIG. 2.

Taking the viewing angle shown in FIG. 3 as an example, when the power portion 51 of the press part 5 arrives at an E-shaped portion of the clutch cam 32, the press part 5 deflects rightwards with the pivot portion 53 as a pivot, the pin 81 is stopped in a pull-out direction of the spring press plate 83 and the brake plate 82, the spring press plate 83 is pressed by the compensation springs 84 in the pull-out direction, during action, the pin 81 sinks (moving inwards the sliding groove) under the limitation of the transfer rotor 511 and the pivot portion 53, and at the time, the force of the compensation springs 84 is changed, according to a lever ratio, into the force pressing the multi-plate clutch 10. Along with abrasion of the multi-plate clutch 10, the sinking degree is gradually reduced, to ensure the torque transmission capacity even in the state, a load of the compensation springs 84 is set, the amount of movement of the pin 81 is the largest when the clutch is new, and along with abrasion of the clutch, the amount of movement of the pin 81 is gradually reduced.

In the embodiment, preferably, the housing 1 is provided with accommodating grooves 12, the compensation springs 84 are disposed in the accommodating grooves 12, and as shown in FIG. 5, the plurality of compensation springs 84 are arranged, and are evenly distributed around the pin 81.

In the embodiment, preferably, a joint of the pin 81 and the pivot portion 53 is set as a ball head structure so that the pivot portion 53 can rotate around an end portion of the pin 81 at random, meanwhile, the pin and the pivot portion are constantly kept connected, and certainly, the pin 81 and the pivot portion 53 may also be rotationally connected through a shaft in one direction.

In the embodiment, preferably, the return structure 9 includes a fixed press plate 91 and a return spring 92, the fixed press plate 91 is fixed to the housing 1, and an interval is reserved between the fixed press plate 91 and the housing 1. The return portion 54 is located between the fixed press plate 91 and the housing 1, and the return spring 92 is located between the fixed press plate 91 and the return portion 54.

Figure 6:
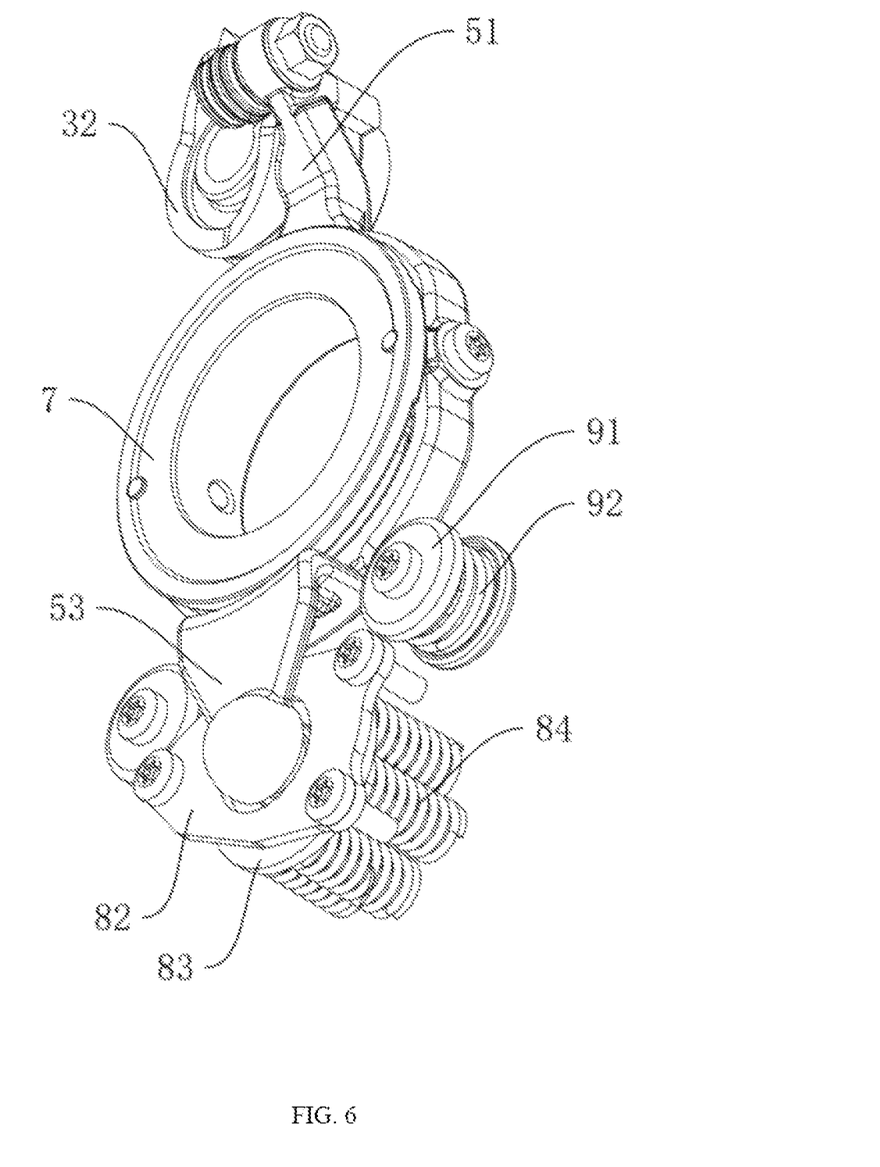
FIG. 6 is a second solid structural diagram of the clutch press unit according to the present disclosure.

As shown in FIG. 5 and FIG. 6, when the transfer rotor 511 at the power portion 51 is located at the valley of the clutch cam 32, with the pivot portion 53 as the pivot, the return spring 92 extrudes the return portion 54 to deflect in a direction away from the multi-plate clutch 10, that is, the multi-plate clutch 10 is disengaged. To make stress of the press part 5 balanced, there are preferably two return structures 9 to be arranged, and the two return structures 9 are symmetrically disposed on two sides of a connecting line of the power portion 51 and the pivot portion 53.

In the embodiment, preferably, the press portion 52 is in a closed ring shape, a press ring 7 is disposed on an inner side of the press portion 52, one side of the press ring 7 protrudes out of the press portion 52, the press ring 7 is rotationally connected to the press portion 52 through a rotating shaft, and an axis of the rotating shaft is perpendicular to the connecting line of the power portion 51 and the pivot portion 53.

FIG. 4 illustrates a state that the press ring 7 tightly presses the combined bearing 6, the combined bearing 6 is not shown in FIG. 5 and FIG. 6, that is, when the press part 5 applies force in the embodiment, force is transmitted by the press ring 7, the press part 5 does not horizontally move in the axial direction in the force application process but deflects with the pivot portion 53 as the pivot, in addition, the position of the pivot portion 53 can change, and thus, the action of the whole press part 5 is not translational. The rotating press ring 7 is arranged, and can transmit the force to the press ring 7, the press ring 7 is constantly kept to be in surface-to-surface contact with the combined bearing 6, that is, the press ring 7 can horizontally move to evenly apply force to the combined bearing 6.

In the embodiment, preferably, the housing 1 is provided with a guide cylinder 11, and the press ring 7 sleeves the guide cylinder 11 and is in sliding connection to the guide cylinder 11. As shown in FIG. 3, the press ring 7 sleeves the guide cylinder 11, a movable gap is reserved between the press ring 7 and the press portion 52 of the press part 5, the guide cylinder 11 further guides the press ring 7 so that when the press portion 52 applies force, the press ring 7 can be kept to move in the axial direction along with the guide cylinder 11 completely without another-direction deflection, thereby ensuring balanced force application to the combined bearing 6.

The above contents are merely preferred implementations of the present disclosure, the scope of protection of the present disclosure is not only limited to the above embodiments, but all technical solutions under the idea of the present disclosure shall fall within the scope of protection of the present disclosure. It should be pointed out that a plurality of improvements and embellishments can be made by those of ordinary skill in the technical field without departing from the principle of the present disclosure and should also be regarded within the scope of protection of the present disclosure.

What is claimed is:

1. A control mechanism for a clutch, comprising a power unit, a drive unit, a shift fork, a clutch press unit and a housing, wherein the power unit comprises an actuator motor and a power shaft which are connected;

the drive unit comprises a shift cam and a clutch cam which are both fixed to the power shaft;

the shift fork is connected to the shift cam; and the clutch press unit comprises a press part with two ends provided with a power driven arm and a pivot plate respectively, a press outer ring is disposed in a middle of the press part, the power driven arm is connected to the clutch cam, an elastic alignment structure is disposed between the pivot plate and the housing, and a return assembly, corresponding to a position between the pivot plate and the press outer ring, is disposed at the press part and is provided with a return-piece;

wherein the elastic alignment structure comprises a pin, the housing is provided with a sliding groove, one end of the pin stretches into the sliding groove, the other end is located outside the sliding groove, a limit structure limiting the pin from sliding out by the distance is disposed between the pin and the housing, the end, located outside the sliding groove, of the pin is rotationally connected to the pivot plate, and compensation springs are disposed between the pin and the housing.

2. The control mechanism for a clutch according to claim 1, wherein the limit structure comprises a brake plate and a spring press plate, the brake plate is fixedly connected to the housing, an interval is reserved between the brake plate and the housing, the spring press plate is located below the brake plate, the compensation springs are located between the spring press plate and the housing, and the pin is connected to the spring press plate.

3. The control mechanism for a clutch according to claim 2, wherein the housing is provided with accommodating grooves, and the compensation springs are disposed in the accommodating grooves.

4. The control mechanism for a clutch according to claim 2, wherein the return piece comprises a fixed press plate and a return spring, the fixed press plate is fixed to the housing, an interval is reserved between the fixed press plate and the housing, the return assembly is located between the fixed press plate and the housing, and the return spring is located between the fixed press plate and the return assembly.

5. The control mechanism for a clutch according to claim 3, wherein the plurality of compensation springs are arranged, and are evenly distributed around the pin.

6. The control mechanism for a clutch according to claim 3, wherein the return piece comprises a fixed press plate and a return spring, the fixed press plate is fixed to the housing, an interval is reserved between the fixed press plate and the housing, the return assembly is located between the fixed press plate and the housing, and the return spring is located between the fixed press plate and the return assembly.

7. The control mechanism for a clutch according to claim 5, wherein a joint of the pin and the pivot plate is set as a ball head structure.

8. The control mechanism for a clutch according to claim 5, wherein the return piece comprises a fixed press plate and a return spring, the fixed press plate is fixed to the housing, an interval is reserved between the fixed press plate and the housing, the return assembly is located between the fixed press plate and the housing, and the return spring is located between the fixed press plate and the return assembly.

9. The control mechanism for a clutch according to claim 7, wherein the return piece comprises a fixed press plate and a return spring, the fixed press plate is fixed to the housing, an interval is reserved between the fixed press plate and the housing, the return assembly is located between the fixed press plate and the housing, and the return spring is located between the fixed press plate and the return assembly.

10. The control mechanism for a clutch according to claim 1, wherein the return piece comprises a fixed press plate and a return spring, the fixed press plate is fixed to the housing, an interval is reserved between the fixed press plate and the housing, the return assembly is located between the fixed press plate and the housing, and the return spring is located between the fixed press plate and the return portion.

11. The control mechanism for a clutch according to claim 10, wherein the press outer ring is in a closed ring shape, a press ring is disposed on an inner side of the press outer ring, one side of the press ring protrudes out of the press outer ring, the press ring is rotationally connected to the press outer ring through a rotating shaft, and an axis of the rotating shaft is perpendicular to a connecting line of the power driven arm and the pivot plate.

12. The control mechanism for a clutch according to claim 1, wherein the housing is provided with a guide cylinder, and the press ring sleeves the guide cylinder and is in sliding connection to the guide cylinder.

13. A control mechanism for a clutch, comprising a power unit, a drive unit, a shift fork, a clutch press unit and a housing, wherein
the power unit comprises an actuator motor and a power shaft which are connected;
the drive unit comprises a shift cam and a clutch cam which are both fixed to the power shaft;
the shift fork is connected to the shift cam; and
the clutch press unit comprises a press part with two ends provided with a power driven arm and a pivot plate respectively, a press outer ring is disposed in a middle of the press part, the power driven arm is connected to the clutch cam, an elastic alignment structure is disposed between the pivot plate and the housing, and a return assembly, corresponding to a position between the pivot plate and the press outer ring, is disposed at the press part and is provided with a return piece;
wherein the return piece comprises a fixed press plate and a return spring, the fixed press plate is fixed to the housing, an interval is reserved between the fixed press plate and the housing, the return assembly is located between the fixed press plate and the housing, and the return spring is located between the fixed press plate and the return assembly.

\* \* \* \* \*